(12) United States Patent
Raksha et al.

(10) Patent No.: US 11,802,210 B2
(45) Date of Patent: Oct. 31, 2023

(54) HYBRID COLORED METALLIC PIGMENT

(71) Applicant: VIAVI SOLUTIONS INC., San Jose, CA (US)

(72) Inventors: Vladimir Raksha, Santa Rosa, CA (US); Joe Garcia, Santa Rosa, CA (US); Paul Kohlmann, Windsor, CA (US); Alberto Argoitia, Santa Rosa, CA (US); Carole Thoraval, Santa Rosa, CA (US); Robert Oberti, Petaluma, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 23 days.

(21) Appl. No.: 17/076,470

(22) Filed: Oct. 21, 2020

(65) Prior Publication Data
US 2021/0032473 A1 Feb. 4, 2021

Related U.S. Application Data

(63) Continuation of application No. 15/849,558, filed on Dec. 20, 2017, now Pat. No. 10,844,227.
(Continued)

(51) Int. Cl.
C09C 1/00 (2006.01)
C09C 1/62 (2006.01)
(Continued)

(52) U.S. Cl.
CPC .......... *C09B 67/0097* (2013.01); *B32B 7/06* (2013.01); *B32B 33/00* (2013.01);
(Continued)

(58) Field of Classification Search
CPC .......... C09B 67/0097; C09B 67/0098; C09C 1/0015; C09C 1/0084; C09C 1/627;
(Continued)

(56) References Cited

U.S. PATENT DOCUMENTS 3,078,177 A ‡ 2/1963 Hann ................. B05D 1/00
427/18
4,268,541 A ‡ 5/1981 Ikeda ................. B05D 1/60
427/17
(Continued)

FOREIGN PATENT DOCUMENTS

CN 1073462 A 6/1993
CN 1265405 A 9/2000
(Continued)

OTHER PUBLICATIONS

Ding Xuejie et al., Production Technology and Application of Plastic Additive, Guangdong Science and Technology Press, Dec. 1996, 1st edition, pp. 559. (Concise statement of relevance provided by English translation of the Notification of Reexamination for Chinese Application No. 2017113901194, dated Nov. 10, 2022).*
(Continued)

*Primary Examiner* — Pegah Parvini
(74) *Attorney, Agent, or Firm* — Mannava & Kang, P.C.

(57) ABSTRACT

A thin film structure including a reflector layer; and a hybrid layer including an organic colored material and at least one of an organic filler and an inorganic filler; wherein a concentration of the at least one of an organic filler or an inorganic filler is in a range of from about 3 wt. % to about 30 wt. %. A method of making a thin film structure is also disclosed.

19 Claims, 6 Drawing Sheets

Related U.S. Application Data

(60) Provisional application No. 62/437,357, filed on Dec. 21, 2016.

(51) Int. Cl.

| | |
|---|---|
| C09C 1/64 | (2006.01) |
| C09C 1/66 | (2006.01) |
| C09B 67/02 | (2006.01) |
| B32B 33/00 | (2006.01) |
| B32B 7/06 | (2019.01) |
| C09B 67/00 | (2006.01) |

(52) U.S. Cl.
CPC ........ *C09B 67/0098* (2013.01); *C09C 1/0015* (2013.01); *C09C 1/0018* (2013.01); *C09C 1/0048* (2013.01); *C09C 1/0084* (2013.01); *C09C 1/627* (2013.01); *C09C 1/64* (2013.01); *C09C 1/66* (2013.01); *B32B 2307/4026* (2013.01); *B32B 2307/416* (2013.01); *B32B 2307/748* (2013.01); *C01P 2004/61* (2013.01); *C01P 2006/60* (2013.01); *C09C 2200/24* (2013.01); *C09C 2220/20* (2013.01)

(58) Field of Classification Search
CPC ... C09C 1/64; C09C 2200/24; C01P 2004/61; C01P 2006/60
See application file for complete search history.

(56) References Cited

U.S. PATENT DOCUMENTS

| | | | | |
|---|---|---|---|---|
| 4,271,256 A ‡ | 6/1981 | Kido | ......................... | G03F 1/54 430/25 |
| 4,344,987 A ‡ | 8/1982 | Ostertag | ............... | C09C 1/0015 106/41 |
| 4,585,673 A | 4/1986 | Sigai | | |
| 4,587,198 A ‡ | 5/1986 | Fisch | ..................... | B41M 5/035 346/13 |
| 4,650,494 A ‡ | 3/1987 | Kutsukake | ............. | B41M 5/395 428/19 |
| 4,838,648 A ‡ | 6/1989 | Phillips | ................. | C09C 1/0015 283/90 |
| 4,866,027 A ‡ | 9/1989 | Henzel | ................... | B41M 5/385 503/22 |
| 4,879,140 A | 11/1989 | Gray et al. | | |
| 4,935,166 A ‡ | 6/1990 | Lee | ......................... | G02B 5/223 252/58 |
| 5,026,429 A ‡ | 6/1991 | Mronga | ............... | C09B 67/0007 106/40 |
| 5,102,213 A ‡ | 4/1992 | Lee | ......................... | G21F 1/103 252/58 |
| 5,213,618 A ‡ | 5/1993 | Souma | ..................... | A61Q 1/02 106/40 |
| 5,270,854 A ‡ | 12/1993 | Lee | ........................ | G21F 1/103 252/58 |
| 5,409,758 A ‡ | 4/1995 | Hiyoshi | ................... | B41M 5/44 428/31 |
| 5,540,770 A ‡ | 7/1996 | Schmid | ..................... | C09D 5/36 106/40 |
| 5,626,661 A ‡ | 5/1997 | Schmid | ................... | C09C 1/0015 106/31 |
| 5,759,255 A | 6/1998 | Venturini et al. | | |
| 5,874,188 A ‡ | 2/1999 | Roberts | .................. | G02B 5/223 216/24 |
| 5,931,996 A ‡ | 8/1999 | Reisser | ................... | A61Q 1/02 106/40 |
| 6,447,553 B1 ‡ | 9/2002 | Mikhael | ............... | B01J 19/1887 106/49 |
| 6,533,857 B1 ‡ | 3/2003 | Schmid | ................... | A61Q 1/02 106/40 |
| 6,565,770 B1 * | 5/2003 | Mayer | ................... | C09C 1/0015 252/301.36 |
| 6,569,529 B1 | 5/2003 | Phillips et al. | | |
| 6,613,383 B1 ‡ | 9/2003 | George | .................... | B01J 2/006 427/21 |
| 6,686,042 B1 ‡ | 2/2004 | LeGallee | .................. | B32B 7/02 106/40 |
| 7,169,327 B2 | 1/2007 | Ito et al. | | |
| 7,455,904 B2 ‡ | 11/2008 | O'Keefe | .................. | C09D 7/69 428/40 |
| 7,459,182 B2 ‡ | 12/2008 | Xiong | ................... | C09C 1/0015 427/21 |
| 7,901,609 B2 ‡ | 3/2011 | Xiong | .................. | C23C 18/143 264/40 |
| 7,951,418 B2 ‡ | 5/2011 | O'Keefe | .................. | C09D 7/70 427/20 |
| 8,980,976 B2 | 3/2015 | Henglein | | |
| 2001/0047739 A1 ‡ | 12/2001 | Archambeault | .......... | C09C 1/62 106/40 |
| 2002/0160194 A1 ‡ | 10/2002 | Phillips | .................. | B42D 25/29 428/40 |
| 2007/0134179 A1 * | 6/2007 | Ino | .......................... | C09D 7/68 106/446 |
| 2008/0191153 A1 ‡ | 8/2008 | Marganski | ............ | C23C 14/564 250/49 |
| 2008/0249209 A1 | 10/2008 | Trummer et al. | | |
| 2009/0069447 A1 * | 3/2009 | Kitamura | ............ | C23C 18/1635 524/443 |
| 2011/0237683 A1 ‡ | 9/2011 | Schmid | ................. | C09C 1/0024 514/77 |
| 2012/0157583 A1 ‡ | 6/2012 | Shiao | ...................... | C04B 26/26 524/64 |
| 2013/0119298 A1 ‡ | 5/2013 | Raksha | ..................... | C09D 7/62 252/62 |
| 2016/0168388 A1 | 6/2016 | Barbe et al. | | |

FOREIGN PATENT DOCUMENTS

| | | | | | |
|---|---|---|---|---|---|
| CN | 1384858 A | | 12/2002 | | |
| CN | 1468289 | ‡ | 1/2004 | | |
| CN | 1468289 A | | 1/2004 | | |
| CN | 1610729 | ‡ | 4/2005 | | |
| CN | 1610729 A | | 4/2005 | | |
| CN | 1688659 A | | 10/2005 | | |
| CN | 1735562 | ‡ | 2/2006 | | |
| CN | 1756805 A | | 4/2006 | | |
| CN | 1784476 A | | 6/2006 | | |
| CN | 1280598 C | | 10/2006 | | |
| CN | 1910243 | ‡ | 2/2007 | | |
| CN | 101238183 A | | 8/2008 | | |
| CN | 101384674 | ‡ | 3/2009 | | |
| CN | 101695466 A | | 4/2010 | | |
| CN | 102037084 A | | 4/2011 | | |
| CN | 102337059 A | | 2/2012 | | |
| CN | 104449334 | ‡ | 3/2015 | | |
| CN | 104781347 | ‡ | 7/2015 | | |
| EP | 0536913 | ‡ | 4/1993 | | |
| EP | 1852475 | ‡ | 11/2007 | | |
| EP | 2410022 | ‡ | 1/2012 | | |
| EP | 2 799 398 | * | 5/2014 | ............... | C01F 7/02 |
| JP | H0959532 | ‡ | 3/1997 | | |
| TW | 300249 B | | 3/1997 | | |
| TW | 1239986 B | ‡ | 9/2005 | | |
| TW | I239986 | | 9/2005 | | |
| WO | 02/10290 | ‡ | 2/2002 | | |
| WO | WO02/10290 | | 2/2002 | | |
| WO | 2016047231 A1 | | 3/2016 | | |

OTHER PUBLICATIONS

Benjamin Tawiah et al., "Phthalocyanine green aluminum pigment prepared by inorganic acid radical/radical polymerization for waterborne textile applications", International Journal of Industrial Chemistry, Biomed Central Ltd, London, UK, vol. 8, No. 1, Jun. 15, 2016, pp. 17-28.‡

Material Safety Data Sheet for Polyaniline. ThermoFisher Scientific (Feb. 21, 2020), 6 pages.

(56) References Cited

OTHER PUBLICATIONS

Material Safety Data Sheet for Polypyrrole. Polysciences Inc., Nov. 15, 2013, 3 pages.
A. Bulanovs et al., "Luminescence and structural properties of thermally evaporated benzanthrone dyes thin films", Opto-Electronics Review 21, No. 2, 2013, 6 pages. No Month.
K P. Gritsenko et al., "Optical properties of dye films deposited in vacuum with laser and plasma action", Proc. SPIE 3738, pp. 461-464, 1999. No Month.
K. Grytsenko et al., "Growth and optical properties of dye films and dye-in-polymer matrix deposited by vacuum evaporation", Semiconductor Physics, Quantum Electronics & Optoelectronics, 2010, vol. 13, No. 2, pp. 177-179 No Month.
K. P. Gritsenko et al., "Dye-filled polymer film formation in vacuum", Proc. SPIE 4833, Applications of Photonic Technology 5, 487 (Feb. 1, 2003), 6 pages.
Konstantin P. Gritsenko et al., "Thin-Film Deposition of Polymers by Vacuum Degradation", Chem. Rev. 2003, 103, pp. 3607-3649. No Month.
M. M. El-Nahass et al., " Optical Properties of Copper Phthalocyanine (CuPc) Thin Films", Egypt. J. Sol., vol. 24, No. 1, 2001, 9 pages. No Month.
M.S. Aziz et al., "Optical properties of Azo Dye (1-Phenylazo-2-Naphthol) thin films", Eur. Phys. J. Appl. Phys. 48, 20401 (Year 2009), 6 pages. No Month.
Pasi Jalkanen et al., "Fabrication and characterization of vacuum deposited fluorescein thin films", Jun. 20, 2011, 24 pageshttps://arxiv.org/abs/1106.3849v1.
Peter Wibling, "Metallic Effect Pigments", European Coatings Literature, Hannover: Vincentz Network, 2006, 4 pages. No Month.
Pia Sundberg et al., "Organic and inorganic-organic thin film structures by molecular layer deposition: A review", Beilstein Journal of Nanotechnology, 2014, 5, pp. 1104-1136. No Month.
Thomas Mayer et al., "Bulk Sensitization of Inorganic Semiconductors with Organic Guest Molecules: Zink Phthalocyanines Embedded in μc-Si and ZnSe Host Matrices", Proceedings of the Photovoltaic Energy Conversion Conference, vol. 1, pp. 190-193, May 7-12, 2006.
Chemical and Health Consumption [M], Dong yan, Dongying: China university of petroleum press, pp. 145-146, Aug. 2008.
English translation of the Notification of Reexamination for Chinese Application No. 2017113901194, dated Sep. 14, 2020, 7 pages. (Explaining the relevancy of reference Chemical and Health Consumption).
Mo Shucheng et al., Organic Pigments, Chemical Industry Press, Dec. 1988, 1st edition, pp. 41-48. (Concise statement of relevance provided by English translation of the Notification of Reexamination for Chinese Application No. 2017113901194, dated Nov. 18, 2022, 10 pages.).
Wang Yuehua et al., Design, Preparation and Application of Thin Films, China University of Mining and Technology Press, 1st edition, Sep. 2016, pp. 47-49. (Concise statement of relevance provided by English translation of the Notification of Reexamination for Chinese Application No. 2017113901194, dated Nov. 18, 2022, 10 pages.).
Wang Yuehua et al., Design, Preparation and Application of Thin Films, China University of Mining and Technology Press, 1st edition, Sep. 2016, pp. 42-52. (Concise statement of relevance provided by English translation of the Notification of Reexamination for Chinese Application No. 2017113901194, dated Nov. 18, 2022, 10 pages, (cited as Exhibit 2.).
Li Fengsheng et al., Post-treatment Technology and Application of Micro-nano Powders, National Defense Industry Press, Sep. 2005, 1st edition, pp. 417-418. (Machine translation provided; cited as Exhibit 3 in English translation of the Notification of Reexamination for Chinese Application No. 2017113901194, dated Nov. 18, 2022, 10 pages, submitted herewith).
Song Jian et al., Microencapsulation Technology and Application, Chemical Industry Press, Sep. 2001, 1st edition, pp. 255. (Machine translation provided; cited as Exhibit 4 in English translation of the Notification of Reexamination for Chinese Application No. 2017113901194, dated Nov. 18, 2022, 10 pages, submitted herewith).
English translation of the Notification of Reexamination for Chinese Application No. 2017113901194, dated Nov. 18, 2022, 10 pages.
"New Materials Dictionary", edited by Zhou Huijiu, pp. 269, Shanghai Science and Technology Literature Publishing House, Dec. 31, 1996, 3 pages. (Concise statement of relevance provided by the English translation of China Office Action, CN Application No. 201711391868.9, dated Oct. 20, 2022, 12 pages. which cited the Zhou Huijiu reference as Exhibit 2).
"Synthetic Resins and Plastics Handbook", edited by Xu Changqing, pp. 687, Chemical Industry Press, Nov. 30, 1991, 3 pages. (Concise statement of relevance provided by the English translation of China Office Action, CN Application No. 201711391868.9, dated Oct. 20, 2022, 12 pages. which cited the Xu Changqing reference as Exhibit 1).
English translation of China Office Action, CN Application No. 201711391868.9, dated Oct. 20, 2022, 12 pages.

\* cited by examiner
‡ imported from a related application

HYBRID COLORED METALLIC PIGMENT

RELATED APPLICATIONS

The present application is a continuation application of U.S. patent application Ser. No. 15/849,558, filed Dec. 20, 2017, which claims priority to U.S. Provisional Application No. 62/437,357, filed on Dec. 21, 2016, the entire disclosure of which is hereby incorporated by reference.

FIELD OF THE INVENTION

The present disclosure generally relates to thin film structures, such as pigments including a reflector layer and a hybrid layer having an organic colored material and at least one of an organic filler or an inorganic filler. Methods of making the thin film structure, such as pigments, are also disclosed.

BACKGROUND OF THE INVENTION

Colored metallic pigments in their simplest form are manufactured from colored metals. Flakes in these pigments have been coated with colored transparent or semi-transparent low refractive index material or high refractive index material. The color effect may come from a combination of reflection, absorption and interference of incident light. Interference colors in interference pigments have been created by formation on the surface of an aluminum flake of a Fabry-Perot structure having a transparent dielectric and semi-transparent metallic absorber.

Methods of fabrication of colored metallic pigments vary in their nature. In one method, the color of flaked aluminum pigment was obtained by formation of a layer of aluminum oxide on its surface by wet oxidation of suspended aluminum flakes with water wherein the color of the pigment was controlled by the thickness of oxide. In another method, aluminum flakes were coated by layers of metal oxides by one of numerous wet chemistry methods, such as a hydrolysis of organic metal ester compounds, or by formation of a metal oxide layer by subjecting one or more precursors of one or more desired metal oxides and an acidic catalyst to microwave radiation, or by fluidized bed CVD. Pigments have also been colored by sol-gel precipitation of silicon dioxide from tetraethyl silicate together with a dispersed colorant. Vacuum deposition technology has been used for fabrication of colored metallic pigment based on the Fabry-Perot structure. For example, colored pigments with saturated color were produced when a spacer layer was made from a material with high (n>2) index of refraction. Color-shifting interference pigments were fabricated when the dielectric layer had a low index of refraction (n<1.6).

SUMMARY OF THE INVENTION

In an aspect, there is disclosed a thin film structure including a reflector layer; and a hybrid layer including an organic colored material and at least one of an organic filler or an inorganic filler; wherein a concentration of the at least one of an organic filler or an inorganic filler is in a range of from about 3 wt. % to about 30 wt. %.

In another aspect, there is disclosed a method of making a thin film structure comprising providing a substrate with a release layer, depositing a first hybrid layer on the release layer by vacuum deposition, depositing a reflector layer on the first hybrid layer, and depositing a second first hybrid layer on the reflector layer to form a thin film structure; wherein the first and second hybrid layer comprises an organic colored material and at least one of an organic filler or an inorganic filler; and wherein a concentration of the at least one organic filler and an inorganic filler is in a range of from about 3 wt. % to about 30 wt. %.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings.

Figure 1:
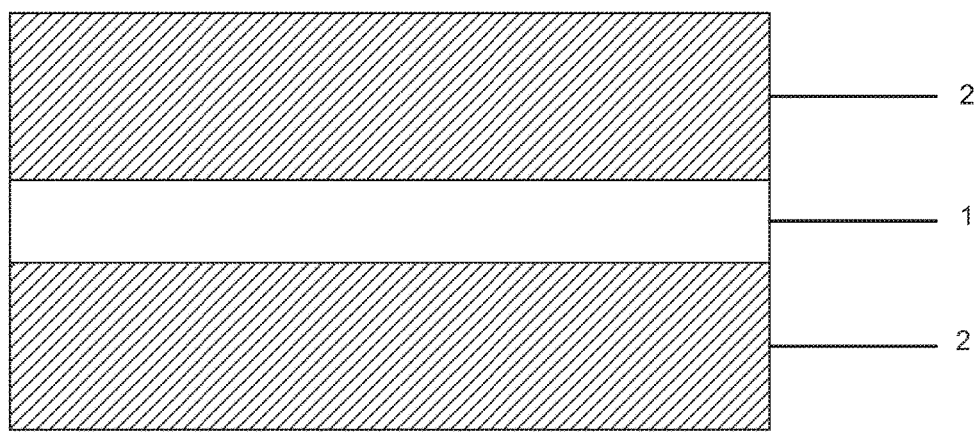
FIG. 1 is a cross-sectional view of a thin film structure, according to an example of the present disclosure.

Referring to FIGS. 1 and 2, in their broad and varied embodiments, disclosed herein is a thin film structure 5 comprising a reflector layer 1 and a hybrid layer 2A, 2B. The hybrid layer 2A, 2B can comprise an organic colored material and at least one of an organic filler or an inorganic filler.

The total thickness of the thin film structure 5 can be less than 10 microns, such as for example from less than about 5 microns. In an aspect, the total thickness of the thin film structure 5 can range from about 0.01 micron to about 10 micron, such as, from about 100 nm to about 5000 nm, for example from about 100 nm to about 4000 nm.

For each example shown in FIGS. 1-2, the materials for the reflector layer 1 can include any material that can render the reflector layer 1 opaque. In an aspect, the material may be a metal and/or metal alloy. In one example, the materials for the reflector layer 1 can include any materials that have reflective characteristics. An example of a reflective material can be aluminum, which has good reflectance characteristics, is inexpensive, and easy to form into or deposit as a thin layer. However, other reflective materials can also be used in place of aluminum. For example, aluminum, zinc, steel, copper, silver, gold, platinum, palladium, nickel, cobalt, niobium, chromium, tin, and combinations or alloys of these or other metals can be used as reflective materials, such as bronze, brass, and stainless steel. In an aspect, the material for the reflector layer 1 can be a white or light colored metal. Other useful reflective materials include, but are not limited to, the transition and lanthanide metals and combinations thereof.

The thickness of reflector layer 1 can range from about 40 nm to about 150 nm, although this range should not be taken as restrictive. For example, the lower limit of 40 nm can be selected for a material such as aluminum so that the aluminum is of a minimum optical density of about 0.5 at a wavelength of about 550 nm. Other reflector materials can justify higher or lower minimum thicknesses in order to obtain a sufficient optical density or achieve the desired effect. The upper limit of about 150 nm can also be higher or lower depending on the desired effect and the materials used.

The reflector layer 1 can be microstructured so as to provide a diffractive property of light. In an aspect, the reflector layer 1 can made of any material and in any thickness so long as the reflector layer 1 is opaque.

In one aspect, the thickness of the reflector layer 1 can range from about 10 nm to about 160 nm for example, from about 15 nm to about 150 nm, from about 20 nm to about 140 nm, from about 25 nm to about 130 nm, from about 30 nm to about 120 nm, from about 40 nm to about 110 nm, or from about 50 nm to about 100 nm, such as from about 60 nm to about 90 nm or from about 70 nm to about 80 nm.

The hybrid layer 2 for use in the thin film structure 5 can include an organic colored material and at least one of an organic filler or an inorganic filler. The hybrid layer 2 can be more than one layer such as a first hybrid layer 2A, a second hybrid layer 2B, a third hybrid layer 2C (not shown in the figures), etc. In an aspect, a hybrid layer 2 can be present on opposite sides of the reflector layer 1. In another aspect, more than one hybrid layer 2 can be present on each side of the reflector layer 1. For example, one side of a reflector layer 1 can include up to three (3) hybrid layers 2A, 2B, 2C and a second side of a reflector layer 1 can include up to three (3) hybrid layers, which can be the same as the hybrid layers on the first side of reflector layer 1, or they can be different hybrid layers, such as hybrid layers 2D, 2E, 2F.

Each of the hybrid layer 2 present in the thin film structure 5 can be the same or different from one another. In an aspect, a first hybrid layer 2A can be the same composition as a second hybrid layer 2B. In another aspect, a first hybrid layer 2A can have the same thickness as a second hybrid layer 2B. Alternatively, each hybrid layer 2 can be different. A first hybrid layer 2A can be a different composition as a second hybrid layer 2B. A first hybrid layer 2A can have a different thickness as a second hybrid layer 2B. Each layer may vary, e.g., same composition, different thickness or different composition and same thickness.

The composition of the hybrid layer 2 can be selected to achieve a certain color or hue. In particular, by selecting a different organic colored material present in each hybrid layer 2, then the combined layers can achieve a certain color or hue. For example, a first hybrid layer 2A can comprise an organic colored material that is yellow. A second hybrid layer 2B, present on top of the first hybrid layer 2A, can comprise an organic colored material that is blue. The resultant color or hue achieved can therefore be green. Similar combinations of organic colored materials in various hybrid layers may result in other color combinations, such as a yellow hybrid layer 2A on a red hybrid layer 2B can result in an overall orange color or hue.

Alternatively, the thin film structure 5 can have a single hybrid layer 2 on each side of the reflector layer 1, such as a green hybrid layer or an orange hybrid layer. The thin film structure 5 can include a red hybrid layer 2A on a first side of the reflector layer 1 and a blue hybrid layer 2B on a second side of the reflector layer 1.

The hybrid layer 2 can have a thickness of from about 10 nm to about 5000 nm, such as from about 20 nm to about 4500 nm, for example from about 30 nm to about 4000 nm. In an aspect, the hybrid layer 2 is less than about 300 nm so that light is not scattered.

The organic colored material can be present in the hybrid layer 2 in an amount less than about 100% by weight relative to the total weight of the hybrid layer 2. It is expected that if there is 100% by weight of organic colored material present in the hybrid layer 2, then the hybrid layer 2 can delaminate from the reflector layer 1.

The organic colored material can comprise any colored material, such as organic pigments. Non-limiting organic pigments include, for example perylene, perinone, quinacridone, quinacridonequinone, anthrapyrimidine, anthraquinone, anthanthrone, benzimidazolone, disazo condensation, azo, azomethine, quinophthalone, indanthrone, phthalocyanine, triarylcarbonium, dioxazine, aminoanthraquinone, isoindoline diketopyrrolopyrrole, thioindigo, thiazineindigo, isoindoline, isoindolinone, pyranthrone, isoviolanthrone, or a mixture thereof.

Additional non-limiting examples of organic pigments for use as an organic colored material include for example C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I.

Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (C.I. No. 11 777), C.I. Pigment Yellow 74 (C.I. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (C.I. No. 12 514), C.I. Pigment Red 185 (C.I. No. 12 516), C.I. Pigment Red 247 (C.I. No. 15 915).

The hybrid layer 2 can include at least one of organic filler or inorganic filler. The at least one organic filler or inorganic filler can be present in the hybrid layer 2 in an amount ranging from about 3 wt. % to about 30 wt. %, for example from about 3 wt. % to about 30 wt. % relative to the total weight of the hybrid layer 2. The amount of the at least one organic filler or inorganic filler can vary along a gradient to achieve a coloration of concentration colors that provide a desirable color to the thin film structure. In an aspect, the at least one of organic filler or inorganic filler can be present in the hybrid layer 2 in varying amounts or concentrations, such as along a length of the hybrid layer 2. For example, a concentration can taper along a length of the hybrid layer so that a first end of the hybrid layer can have a higher concentration of, for example, an organic filler, and the second end of the hybrid layer can have a lower concentration of, for example, the organic filler. Additionally, the first end of the hybrid layer can have a low concentration of, for example, an inorganic filler, and the second end of the hybrid layer can have a high concentration of, for example, the inorganic filler. This aspect can occur if the organic filler or inorganic filler are deposited downstream one from the other.

In another aspect, the at least one organic filler or inorganic filler can be uniformly dispersed in the hybrid layer 2. For example, the at least one organic filler or inorganic filler can be pre-mixed and therefore co-deposited with the organic colored material.

In yet another aspect, the at least one organic filler or inorganic filler can be present in the hybrid layer 2 in an amount to improve adhesion. For example, a filler exhibiting poor adhesion characteristics can be deposited after a filler exhibiting good adhesion has been deposited. In this manner, the filler having good adhesion can be used to more increase the adhesion of the filler having poor adhesion.

The organic filler or inorganic filler for use in the hybrid layer 2 can be made from any materials. Non-limiting examples of suitable materials include magnesium fluoride, silicon monoxide, silicon dioxide, aluminum oxide, aluminum fluoride, titanium dioxide, aluminum nitride, boron nitride, boron carbide, tungsten oxide, cerium fluoride, lanthanum fluoride, neodymium fluoride, samarium fluoride, barium fluoride, calcium fluoride, lithium fluoride, tungsten carbide, titanium carbide, titanium nitride, silicon nitride, zinc sulfide, glass flakes, diamond-like carbon, and combinations thereof.

The organic filler or inorganic filler can be made from materials having a refractive index ranging from about 1.3 to about 2.3. In an aspect, the organic filler or inorganic filler can be a material having a low refractive index of less than about 1.65. In another aspect, the organic filler or inorganic filler can be a material having a high refractive index of greater than about 2.2.

A method of making the thin film structure 5 can include providing a substrate 4 with a release layer 3. The substrate 4 can be made of any material. For example, a 1 mil polyester can be used as the substrate 4; however, other organic webs and other thicknesses can be used. Organic webs can include polyethylene terephthalate, polyethylene, oriented polypropylene, polycarbonate, polyvinylbutyral, polyhexadiene, and polyimide. Alternatively, webs that do not require transparency can be used. The thickness of the substrate 4 can range from about 0.5 mil to about 5 mil.

Figure 2A:
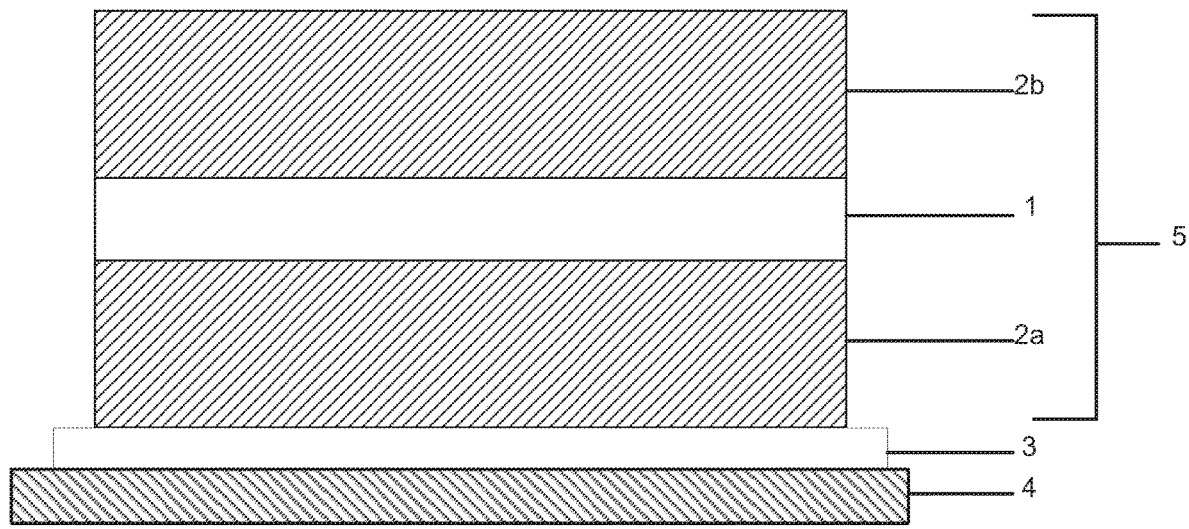
FIG. 2A is a cross-sectional view of a thin film structure prior to being released from a substrate having a release layer, according to an example of the present disclosure.
Figure 2B:
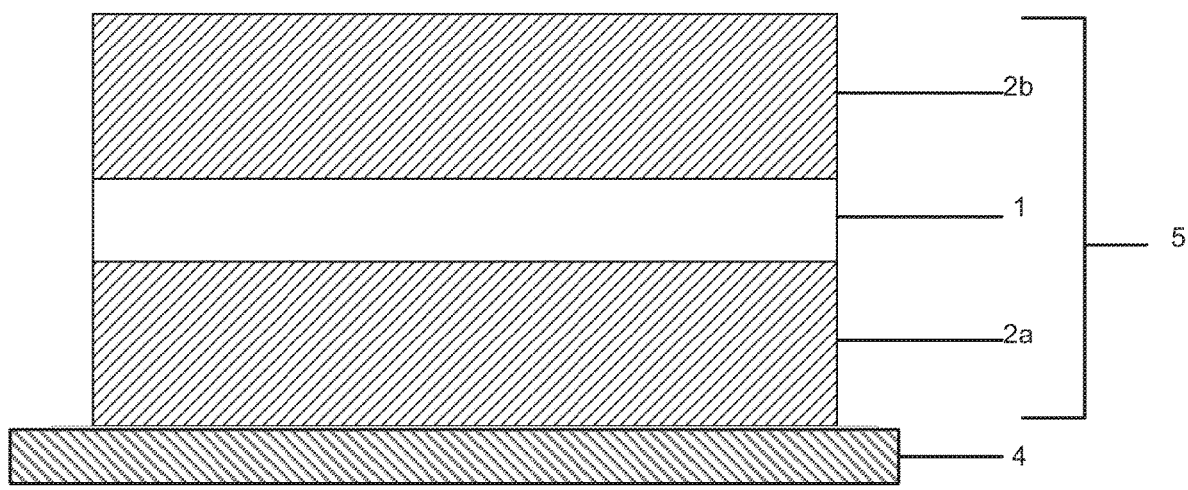
FIG. 2B is a cross-sectional view of a thin film structure prior to being released from a substrate, according to an example of the present disclosure.

The method can include depositing a first hybrid layer 2a onto a substrate 4, as shown in FIG. 2B. The substrate 4 can include a release layer 3, as shown in FIG. 2A. In an aspect, the organic colored material can be co-deposited with at least one of the organic filler or the inorganic filler to deposit the first hybrid layer. The vacuum deposition can be any known vacuum deposition technique, such as physical vapor deposition, chemical vapor deposition, fluidized bed chemical vapor deposition, and the like. A reflector layer 1 can then be deposited on the first hybrid layer 2A using any deposition technique that would not encapsulate the reflector layer 1. For example, the reflector layer 1 can be deposited by vacuum deposition. A second hybrid layer 2B can then be deposited onto the reflector layer 1 to form a thin film structure 5. The second hybrid layer 2B can be deposited using a vacuum deposition technique.

The entire structure, i.e., the thin film structure 5 on the release layer 3 of the substrate 4, can then be immersed into a solvent, such as an organic solvent. The organic solvent can be any carbon-compound-containing solvent, such as amides, sulfones, sulfolenes, selenones, and saturated alcohols. Non-limiting organic solvents include methylene chloride, ethyl acetate, dimethyl sulfoxide, tetrahydrofuran, dimethylformamide, ethanol, sulfolane (tetrahydrothiopene-1,1-dioxide), 3-methylsulfolane, n-propyl sulfone, n-butyl sulfone, sulfolene (2,5-dihydrothiopene-1,1-dioxide), 3-methylsulfolene, amides such as 1-(2-hydroxyethyl)-2-pyrrolidinone (HEP), dimethylpiperidone (DMPD), N-methyl pyrrolidinone (NMP), and dimethylacetamide (DMAc), dimethylformamide (DMF), propanol, butanol, hexanol, ethylene glycol, propylene glycol, glycerol, and hexafluoroisopropanol. The organic solvent can dissolve the release layer effectively separating the thin film structure 5 from the substrate 4.

The released thin film structure 5 can be filtered and sized using standard sizing techniques, such as mechanical grinding, for example by ball milling, etc. The thin film structure 5 can be sized to achieve an average particle size ranging from about 5 to about 100 microns, for example from about 7 to about 50 microns, a further example from about 9 to about 40 microns, and as a further example from about 10 to about 20 microns.

Thin film structure can have additional layers, such as a protectant layer, a passivation layer, a dielectric layer.

The thin film structure 5 can be a pigment. The pigment can also include a liquid medium.

The thin film structure 5 can be used with light detection and radar (LIDAR) technology.

EXAMPLES

Example 1

Figure 3:
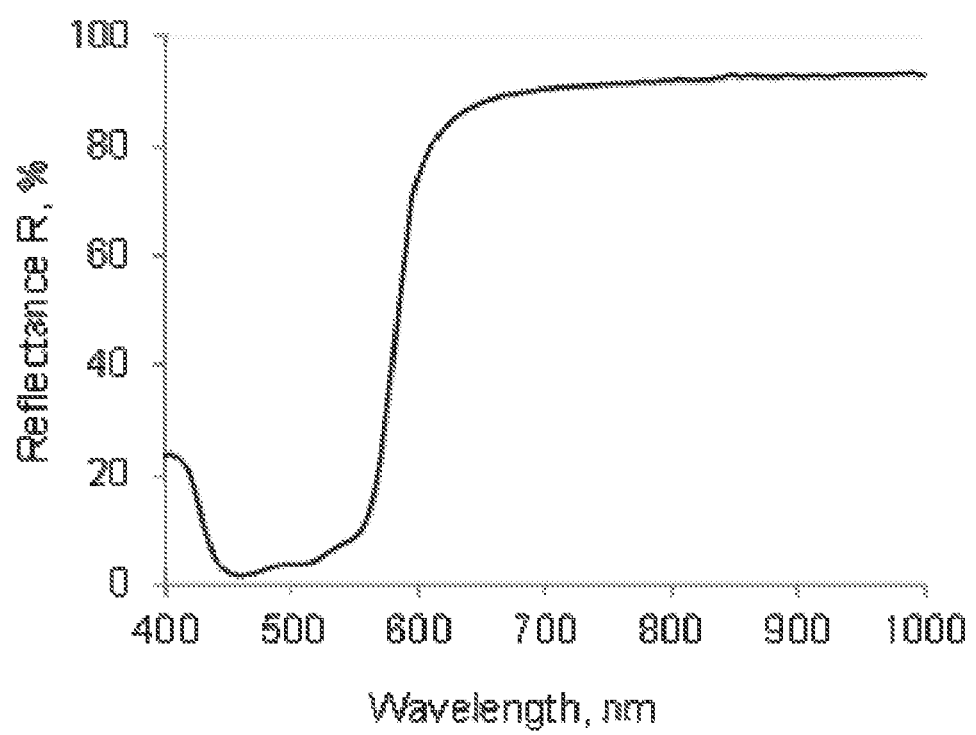
FIG. 3 is a graph of reflectance of a thin film structure, according to an example of the present disclosure.
Figure 4:
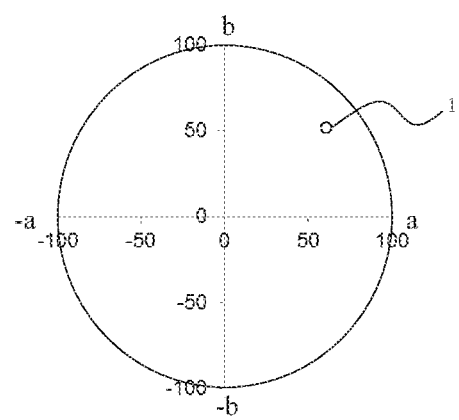
FIG. 4 is a L*a*b* color space of a thin film structure, according to an example of the present disclosure.

Magnesium fluoride and 3,6-Bis(4-chlorophenyl)-2,5-dihydropyrrolo[3,4-c]pyrolle-1,4-dione (Pigment Red 254, CAS Number 84632-65-5) were simultaneously evaporated in vacuum and deposited as a first hybrid layer 2B onto a release layer 3 of a polyester substrate 4 until the thickness of the first hybrid layer 2B came to about 300 nm, as shown in FIG. 2. The process was stopped at this point and an 80 nm thick layer of reflector layer (copper) 1 was deposited on top of the first hybrid layer 2B. A second hybrid layer 2A was deposited on the top of the reflector layer (copper) 1. The polyester substrate 4 was coated with a solvent-sensitive release layer 3. The first hybrid layer 2B was coated on a top side of the release layer 3. The reflector layer 1 was deposited on the top of the release layer 3 and followed by a second hybrid layer 2A. The entire structure was immersed in an organic solvent after completion of vacuum deposition. The release layer 3 was dissolved and the three-layer thin film structure 5 was filtered and mechanically ground until the average size of the platelets was in the range of from about 10 to about 20 microns. The total thickness of the thin film structure 5 was 670 nm. The magnesium fluoride (MgF$_2$) concentration in the hybrid layer 2A, 2B was about 26.5 wt. %. Reflectance of the thin film structure 5 is illustrated in FIG. 3. The color of the pigment was red. The color value of the pigment was illustrated in the L*a*b* color space in FIG. 4.

Example 2

Figure 5:
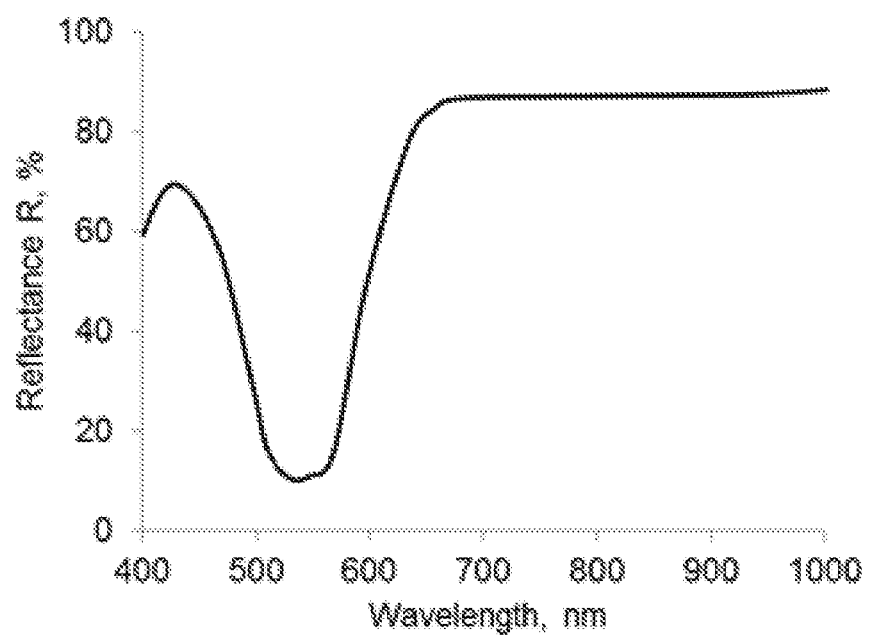
FIG. 5 is a graph of reflectance of a thin film structure, according to another example of the present disclosure.
Figure 6:
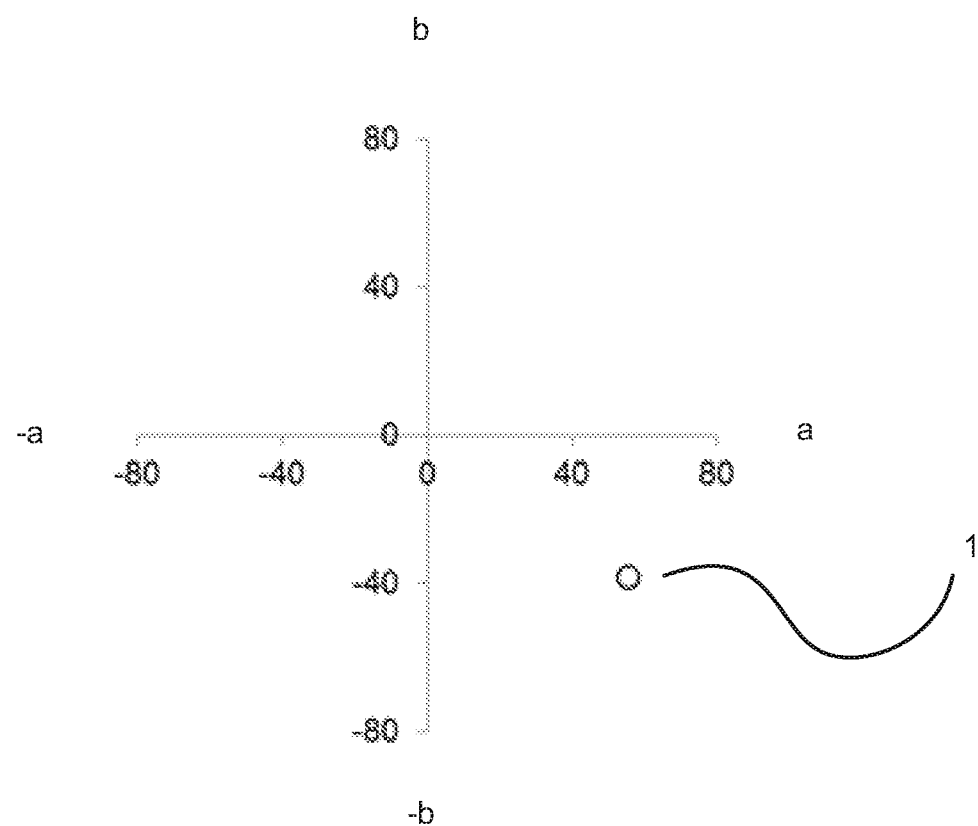
FIG. 6 is a L*a*b* color space of a thin film structure, according to another example of the present disclosure.

Quinacridone violet (Pigment Violet 19, CAS Number: 1047-16-1) was co-deposited with MgF$_2$ as a hybrid layer 2A, 2B in the structure similar to the one in FIG. 2 with aluminum as the reflector layer 1. The total thickness of the thin film structure 5 was 721 nm with a MgF$_2$ concentration of 16 wt. %. Reflectance of the thin film structure 5 is illustrated in FIG. 5. The color of the pigment was violet. The color value of the pigment was illustrated in the L*a*b* color space in FIG. 6.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A thin film structure, comprising:
a microstructured reflector layer laving a first side and a second side;
wherein the first side includes two or three hybrid layers, and
wherein the second side includes up to three hybrid layers, hybrid layer comprises an organic colored material and at least one filler chosen from an organic filler and an inorganic filler, wherein the at least one filler is present in the hybrid layer in an amount ranging from about 3 wt. % to about 30 wt. % relative to the total weight of the hybrid layer.

2. The thin film structure of claim 1, wherein the reflector layer is opaque.

3. The thin film structure of claim 1, wherein the first side has three hybrid layers.

4. The thin film structure of claim 1, wherein the first side has two hybrid layers.

5. The thin film structure of claim 1, wherein the second side has three hybrid layers.

6. The thin film structure of claim 1, wherein the second side has two hybrid layers.

7. The thin film structure of claim 4, wherein the two hybrid layers include different organic colored materials in each hybrid layer.

8. The thin film structure of claim 3, wherein the three hybrid layers include different organic colored materials in each hybrid layer.

9. The thin film structure of claim 1, wherein the at least one organic filler or inorganic filler is uniformly dispersed in the hybrid layer.

10. The thin film structure of claim 1, further comprising a protectant layer.

11. The thin film structure of claim 1, further comprising a passivation layer.

12. The thin film structure of claim 1, further comprising a dielectric, layer.

13. The thin film structure of claim 1, wherein the reflector layer is copper, and the hybrid layer includes magnesium fluoride and 3,6-Bis(4-chlorophenyl 2,5-dihydropyrrolo[3,4-c]pyrolle-1,4-dione.

14. The thin film structure of claim 1, wherein the reflector layer is aluminum, and the hybrid layer includes magnesium fluoride and quinacridone.

15. A thin film structure, comprising:
a microstructured reflector layer having a first side and a second side;
wherein the first side includes up to three hybrid layers, and
wherein the second side includes up to three hybrid layers,
a hybrid layer comprises an organic colored material and at least one filler chosen from an organic filler and an inorganic filler, wherein the at least one filler is present in the hybrid layer in an amount ranging from about 3 wt. % to about 30 wt. % relative to the total weight of the hybrid layer,
wherein an amount of the at least one organic filler or inorganic filler varies along a gradient along a length of the hybrid layer.

16. The thin film structure of claim 1, wherein a first end of the hybrid layer has a higher concentration of the at least one organic filler or inorganic filler as compared to a second end of the hybrid layer.

17. A method of making a thin film structure, comprising:
a. co-depositing, on a reflector layer, an organic colored material and at least one filler chosen from an organic filler and an inorganic filler to form a hybrid layer, and
b. mechanically grinding the thin film structure to an average platelet size of 10 to 20 microns, wherein the at least one filler is present in the hybrid layer in an amount ranging from about 3 wt. % to about 30 wt. % relative to the total weight of the hybrid layer.

18. A method of making a thin film structure, comprising: providing a substrate with a release layer;
co-depositing, on the substrate with release layer, an organic colored material and at least one filler chosen from an organic filler and an inorganic filler to form a first hybrid layer;
co-depositing, on a reflector layer, an organic colored material and at least one filler chosen from an organic filler and an inorganic filler to form a second hybrid layer, wherein the at least one filler is present in the hybrid layer in an amount ranging from about 3 wt. % to about 30 wt. % relative to the total weight of the hybrid layer.

19. The method of claim 18, wherein the reflector layer is deposited on the first hybrid layer.

* * * * *